United States Patent Office 3,330,883
Patented July 11, 1967

3,330,883
COPOLYMERIZATION OF LOW CARBON NUMBER AND HIGH CARBON NUMBER OLEFIN FRACTIONS
Joseph P. Giannetti, Oakmont, and Alfred M. Henke, Springdale, Pa., assignors to Gulf Research & Development Company, Pittsburgh, Pa., a corporation of Delaware
No Drawing. Filed Apr. 6, 1964, Ser. No. 357,762
11 Claims. (Cl. 260—683.15)

This invention relates to new synthetic lubricating oils prepared by the copolymerization of selected alpha olefins using a Friedel-Crafts catalyst system.

The use of a Friedel-Crafts catalyst system is well known in the art for the polymerization of alpha olefins. It is also well known in the art to prepare synthetic lubricants from olefinic hydrocarbons. It is, however, difficult to obtain high viscosity lubricating oils having both a high viscosity index (greater than about 120 V.I.) and a low pour point (plus 10° F. and lower). A high viscosity lubricating oil is defined here as an SAE 30 to 50 grade oil which has a viscosity at 210° F. between 58 and about 110 Saybolt Universal seconds (SUS). It has been found that lubricating oils prepared by the polymerization of alpha olefins using a Friedel-Crafts catalyst system vary in their properties depending upon the number of carbon atoms in the olefinic charge stock and the molecular weight of the final product. The most desirable lubricating oils from a viscosity index and pour point standpoint are prepared by the homopolymerization of alpha olefins containing between about 9 and 14 carbon atoms per molecule. These particular olefins, however, are also highly desirable and in great demand for other processes. For example, the alpha olefins having between 11 and 14 carbon atoms per molecule are useful for the preparation of detergents. Lubricating oils prepared by the homopolymerization of low molecular weight alpha monoolefins having less than about 9 carbon atoms per molecule are unsatisfactory from a viscosity index standpoint while lubricating oils prepared by the homopolymerization of mono alpha olefins having above about 14 carbon atoms per molecule are unsatisfactory in that their pour points are too high.

It was, however, found quite unexpectedly that copolymers prepared from a mixture of certain high and low molecular weight alpha olefins resulted in the production of high viscosity lubricating oils having unexpectedly high viscosity indices and low pour points so long as the average number of carbon atoms in the mixture of alpha olefin monomers contained between 9 and 14 carbon atoms and the molecular weight of the copolymer was between 500 and 1500.

In accordance with the invention, a lubricating oil composition having a molecular weight between 500 and 1500, a viscosity at 210° F. between 58 and 110 SUS; a viscosity index greater than about 120 and a pour point less than about plus 10° F. can be prepared by a process which comprises copolymerizing a mixture of at least two alpha olefins having between 6 and 16 carbon atoms per molecule in the presence of at least one percent by weight of said olefin mixture of a Friedel-Crafts catalyst at a temperature between 100° and 250° F. and a pressure sufficient to maintain the reactants in the liquid phase, said alpha olefins being present in said mixture in such proportions that the mean value of the carbon atoms per molecule in the mixture is between 9 and 14.

The charge stock is a mixture of at least two alpha olefins having between 6 and 16 carbon atoms per molecule. The molar proportions of the olefins in the charge stock should be such that the mean value of the chain length, i.e., the mean carbon number per molecule, is between 9 and 14 and preferably between 10 and 12. The individual alpha olefins which can be used in preparing the copolymers of this invention can be represented by the general formula:

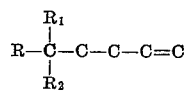

where R can be a saturated alkyl group having between 1 and 11 carbon atoms; $R_1$ and $R_2$ can be hydrogen or a saturated alkyl group having between 1 and 10 carbon atoms; and wherein the sum of the carbon atoms in R, $R_1$ and $R_2$ is between 1 and 11. Thus the alpha olefins which are contemplated for use in preparing the copolymer compositions of this invention are those terminal monoolefins which have no branching on any carbon atom closer than the carbon atom in the gamma position with respect to the terminal olefin bond. Thus, a 50/50 molar mixture of octene-1 and hexadecene-1 could be employed, the mean value being an olefin having 12 carbon atoms per molecule. As another example, a 50/50 molar mixture of hexene-1 and tetradecene-1 could be employed, said mixture having a mean carbon number per molecule value of 10. Alpha-olefins having less than 6 carbon atoms per molecule are not suitable for preparing the copolymers of this invention because of the low viscosity indices of the copolymers prepared from these alpha olefins. Alpha-olefins having more than 16 carbon atoms per molecule are likewise unsuitable for preparing the copolymers of this invention since the pour points of polymers prepared from $C_{17}$ plus alpha olefins are too high to be of interest as lubricating oils even when combined with low carbon number alpha olefins. Mixtures of several low carbon number and several high carbon number alpha olefins can also be employed so long as the average or mean value of the carbon numbers per molecule is within the range defined above. Minor amounts, several percent, of olefins outside the range specified can, of course, be tolerated without deleterious results.

It is preferred that the lubricating oil compositions of this invention be obtained by a process which comprises copolymerizing a mixture of at least one alpha olefin having between 6 and 10 carbon atoms per molecule and at least one alpha olefin having between 14 and 16 carbon atoms per molecule, said alpha olefins being present in said mixture in such molar proportions that the mean value of the carbon atoms per molecule in the mixture is between 10 and 14.

The more preferred low carbon number alpha olefins are those having between 6 and 8 carbon atoms per molecule while the more preferred high carbon number alpha olefins are those having between 15 and 16 carbon atoms per molecule. It is additionally preferred, as noted above, to have the molar proportions of the alpha olefins such that the mean value of the chain length is between 10 and 12. In this preferred case, the amount of the low carbon number alpha olefin is within the range between 33⅓ and 75 mole percent of the alpha olefin mixture and the amount of the high carbon number alpha olefin is within the range between 25 and 66⅔ mole percent of the alpha olefin mixture.

Examples of suitable alpha olefins which can be used in the charge stock to form the compositions of this invention include hexene-1; octene-1; nonene-1; 5,5-dimethyloctene-1; decene-1; 6-cyclohexyl hexene-1; 6-cyclohexyl-nonene-1; tetradecene-1; 8-ethyl decene-1; and hexadecene-1.

Diluents, such as paraffinic hydrocarbons, can also be present in the charge stock. The diluent should be a saturated hydrocarbon type compound which includes, for example, besides the paraffins already mentioned, naphthenes and organic halogen compounds. Diluents which are to be avoided include aromatics, sulfur, nitrogen and oxygen containing materials. The diluents aid in reducing the viscosity of the reaction mixture, in acting as a catalyst dispersant, and in providing a heat sink for the exothermic reaction. It is understood that minor amounts of these diluents may, in the presence of the Friedel-Crafts catalyst, form olefins which may enter into the reaction. Especially preferred are the low molecular weight paraffinic compounds, such as those having between 5 and 8 carbon atoms per molecule. The temperature of the reaction can be controlled by operating at the reflux conditions of these diluents. The weight ratio of the diluent to the mixture of alpha olefins in the charged stock can vary between 0.5 and 10, with a preferred weight ratio between 2 and 6.

Specific examples of suitable diluents include butane, isobutane, pentane, neopentane, hexane, cyclohexane, heptane, octane, cyclooctane, decane, dimethylcyclohexane, carbon tetrachloride, ethyl chloride, butyl chloride, etc.

Thus, charge stocks comprising mixtures of alpha olefins and diluents obtained, for example, by the cracking of wax or the thermal cracking or hydrocracking of other hydrocarbons can be employed, if desired.

Any Friedel-Crafts metal halide catalyst can suitably be employed for preparing the alpha olefin polymer lubricants of this invention. Examples of suitable Friedel-Crafts metal halide catalysts include aluminum bromide; aluminum chloride; antimony pentachloride; beryllium bromide; beryllium chloride; ferric bromide; ferric chloride; gallium trichloride; stannic bromide; stannic chloride; titanium tetrabromide; titanium tetrachloride; zinc chloride; and zirconium chloride. The preferred Friedel-Crafts metal halide catalysts are the aluminum halides, and particularly preferred is aluminum chloride. Mixtures of Friedel-Crafts metal halide catalysts can also suitably be employed, such as mixtures of aluminum chloride with aluminum bromide, etc.

The amount of Friedel-Crafts metal halide catalyst is at least one percent by weight of the mixture of alpha olefins in the charge stock. The amount of catalyst can vary between 1 and 10 weight percent based on the amount of the alpha olefins in the charge and is preferably between 2 and 6 weight percent of the alpha olefins. Amounts of catalyst below those specified result in too slow a reaction rate while amounts of catalyst above those specified have no beneficial effect.

The reaction temperature appears to be the most critical variable in producing the desired polymers using the Friedel-Crafts catalyst system. The reaction temperature can vary between 100° and 250° F., with the preferred reaction temperature between 175° and 225° F. At reaction temperatures below about 100° F., the yields of material in the desired viscosity range are too low to be of interest. At reaction temperatures above about 250° F., the product begins to decompose.

The reaction pressure should be sufficient to keep the alpha olefins in the liquid phase. Higher pressures have no advantage.

While the mixture of alpha olefins and catalyst can be admixed in total and a product obtained, due to the highly exothermic nature of the reaction, and in order to obtain a more desirable molecular weight distribution, it is preferred to add the alpha olefins separately or as a mixture to a slurry of the catalyst in a diluent. The alpha olefin addition rate, i.e. the moles of alpha olefin per hour per mole of catalyst, can be between about 2 and 200, or more, but is preferably between 10 and 100. Good stirring is also desired to control temperature and achieve a more desirable molecular weight distribution.

The reaction time is sufficient to produce a copolymer in the desired molecular weight range. The contact time should be at least 10 minutes and can be as long as 12 hours or more. It has been found that the viscosity of the polymer boiling in the 725° F. plus range at atmospheric pressure appears to be within the desired range of between 58 and 110 SUS at 210° F. even at the prolonged contact times of 12 hours or more.

The copolymer compositions of this invention prepared by the process described above have a molecular weight between about 500 and 1500. Copolymers having molecular weights outside this range are not suitable as lubricating oils since they would either be too light (molecular weight below about 500) or too viscous (molecular weight greater than about 1500). The molecular weights of the polymers of this invention were determined by the vapor pressure osmometer method. This method is described in "A Thermometric Method for Thermodynamics Studies and Molecular Weight Determinations in Solutions" by W. I. Higuchi, M. A. Schwartz, E. G. Rippie and T. Higuchi in the Journal of Physical Chemistry, 63, No. 6, pp. 996–999 (June 24, 1959); and "Petroleum Week," Processing and Petrochemicals Section, page 42, Dec. 30, 1960. The theory is further described in the article "Measurement of Vapor Pressures by Means of Matched Thermistors" by A. P. Brady, Harriette Huff, and J. W. McBain appearing in the Journal of Physical and Colloid Chemistry, 55, No. 2, pp. 304–311 (February 1951).

The copolymers which form the lubricating oil compositions of this invention boil at a temperature of 725° F. plus at atmospheric pressure. The copolymers are further characterized in having a viscosity at 210° F. of between 58 and about 110 SUS. These are the heavier type lubricating oils generally designated as SAE 30 to 50 grade oils. As noted above, normally it is difficult to obtain these heavier grade oils having viscosity indices over about 120 together with low pour points of plus 10° F. or lower. Nevertheless, the copolymer lubricating oil compositions of this invention have viscosity indices above about 120 and pour points of less than plus 10° F. This is a particularly surprising and unexpected result for those copolymer compositions prepared by copolymerizing a mixture of at least one alpha olefin having between 6 and 8 carbon atoms per molecule and at least one alpha olefin having between 15 and 16 carbon atoms per molecule, the molar proportions of said alpha olefins in said mixture being such that the mean value of the carbon atoms per molecule in the mixture is between 10 and 12. This is particularly surprising since the homopolymers perpared from alpha olefins having between 6 and 8 carbon atoms per molecule have excellent low pour points, but undesirably low viscosity indices; while the homopolymers of alpha olefins having between 15 and 16 carbon atoms per molecule have the desired viscosity indices but the pour points are undesirably high. Fortuitously, if the selected individual alpha olefins are admixed in the molar proportions defined above, and copolymerized in accordance with the process defined above, a copolymer composition suitable as a lubricating oil is produced which has the best properties of the low and high carbon number homopolymers.

This invention will be further described with reference to the following specific examples.

The copolymerizations, as well as the reference homopolymerizations, were carried out in a three-liter, three-necked, round-bottomed flask equipped with a sealed stirrer, Friedrich condenser, gas inlet tube, and addition funnel. The aluminum chloride catalyst (0.062 mole), sealed in a small ampule under an inert atmosphere, was placed in the flask. Heptane diluent (10.6 moles) was transferred from a storage container to the flask after being dried by passage through activated 13X molecular sieves. While introducing the diluent, the temperature within the system was controlled by the outside circulation of a heated oil at 10°–20° F. below the boiling point of the heptane. The catalyst ampule was then broken by stirring. The reactions were conducted at 209° F., the boiling point of the heptane diluent. The olefin or olefin mixture (2.1 total moles) was added at the rate of 57.6 moles of olefin mixture per hour per mole of AlCl₃. The total addition time was thirty-five minutes. The reaction mixture was rapidly stirred throughout the addition. The heat of reaction was removed by both the circulating outside oil and the vaporization of the heptane diluent. At the conclusion of the addition of the olefin mixture, the contents of the reaction flask were poured into a sufficient quantity of water to decompose the AlCl₃. The heptane-polymer system was water washed several times, dried over anhydrous sodium sulfate, and then fractionated by distillation. The final polymer was taken as the 725° F. plus material.

*Example 1*

Decene-1 was polymerized by adding the decene-1 to the mixture of heptane and aluminum chloride as described. The reaction product was water washed to remove the catalyst and the hydrocarbon phase was distilled to remove everything boiling below 725° F. at atmospheric pressure, the actual distillation occurring under 1 millimeter of mercury pressure. Properties of the decene-1 polymer are given in Table I below.

*Example 2*

Example 1 was repeated except hexadecene-1 was used as the olefin charge stock. Properties of the hexadecene-1 polymer are also given in Table I below.

*Example 3*

Example 1 was repeated except the 50/50 molar mixture of decene-1 and hexadecene-1 was employed as the charge stock. Properties of the copolymer are also given in Table I below.

Referring to Table I, it can be noted that the copolymer has a viscosity index one point higher (133) than the hexadecene-1 homopolymer (132). This was quite unexpected.

*Example 4*

Example 1 was repeated except octene-1 was used as the charge stock. Properties of the octene-1 homopolymer are also given in Table I below.

*Example 5*

An equimolar mixture of octene-1 and hexadecene-1 were copolymerized in a manner similar to that of Example 1 above. Properties of the copolymer are also given in Table I below.

Referring to Table I, the octene-1–hexadecene-1 copolymer which has a mean carbon atom per molecule value of 12, has a viscosity index approaching that of the $C_{16}$ homopolymer, i.e. the higher value, while retaining an acceptably low pour point. A $C_{12}$ homopolymer in the same molecular weight range was also prepared according to the method of Example 1 and the viscosity index of the $C_{12}$ homopolymer was also 130. Thus, by utilizing less valuable low and high molecular weight olefins, a lubricating oil having the desirable viscosity index properties of a $C_{12}$ homopolymer was obtained.

*Example 6*

Example 1 was repeated except hexene-1 was used as the charge stock. Properties of the hexene-1 homopolymer are given in Table I below.

*Example 7*

Example 1 was repeated except tetradecene-1 was used as the charge stock. Properties of the tetradecene-1 homopolymer are given on Table I below.

*Example 8*

Example 1 was repeated except an equimolar mixture of hexene-1 and tetradecene-1 was used as the charge stock. The average number of carbon atoms per molecule in the mixture was 10. Properties of the copolymer are given on Table I below.

Referring to Examples 6, 7 and 8 on Table I, the viscosity index of the copolymer in Example 8 is above 120 and approaching the viscosity index of the tetradecene-1 homopolymer, while the pour point is excellent at −20° F. The molecular weight of the copolymer in Example 8 was 810.

*Example 9*

Example 1 was repeated except an equimolar mixture of octene-1 and 1-tetradecene was used as the charge stock. The average number of carbon atoms per molecule in the mixture was 11. Properties of the copolymer are given on Table I below.

Referring to Table I, the octene-1–tetradecene-1 copolymer has an excellent viscosity index over 120 and an excellent pour point of −20° F. The molecular weight of the copolymer in Example 9 was found to be 965.

TABLE I

| Example No. | Alpha Olefin | Mean Carbon Atoms per Molecule | Properties of 725° F. plus material | | | |
|---|---|---|---|---|---|---|
| | | | Molecular Weight | Viscosity at 210° F. in SUS | Viscosity Index | Pour Point of— |
| 1 | Decene-1 | 10 | 684 | 62 | 126 | −70 |
| 2 | Hexadecene-1 | 16 | 1,221 | 110 | 132 | +35 |
| 3 | {50 mole percent decene-1 / 50 mole percent hexadecene-1} | 13 | *780 | 76 | 133 | +10 |
| 4 | Octene-1 | 8 | 734 | 85 | 120 | −40 |
| 5 | {50 mole percent octene-1 / 50 mole percent hexadecene-1} | 12 | *1,000 | 92 | 130 | +10 |
| 6 | Hexene-1 | 6 | 861 | 92 | 107 | −35 |
| 7 | Tetradecene-1 | 14 | +843 | 70 | 134 | 0 |
| 8 | {50 mole percent hexene-1 / 50 mole percent tetradecene-1} | 10 | 810 | 80 | 125 | −20 |
| 9 | {50 mole percent octene-1 / 50 mole percent tetradecene-1} | 11 | 965 | 87 | 127 | −20 |

*Approximately.

The above examples show that high viscosity lubricating oils having viscosity indices above about 120 and pour points of plus 10° F. and lower can be prepared by copolymerizing mixtures of alpha olefins having between 6 and 16 carbon atoms per molecule, the average number of carbon atoms per molecule being between 9 and 14.

One advantage to producing lubricating oils according to the method described above, namely adding the mixture of olefins to a diluent-catalyst mixture at a temperature between 100 and 250° F., is the ability to use only the aluminum halide catalyst without a separately added co-catalyst such as a gaseous hydrogen halide. It is believed that under the conditions of the reaction, a hydrogen halide is produced in situ.

Resort may be had to such variations and modifications as fall within the spirit of the invention and the scope of the appended claims.

We claim:
1. A method of preparing a lubricating oil composition having a molecular weight between 500 and 1500; a viscosity at 210° F. between 58 and about 110 SUS; a vis- cosity index greater than about 120 and a pour point no higher than plus 10° F. which comprises copolymerizing a mixture of at least one low carbon number alpha olefin having between 6 and 10 carbon atoms per molecule and at least one high carbon number alpha olefin having between 14 and 16 carbon atoms per molecule in contact with at least one percent by weight of said olefin mixture of a Friedel-Crafts catalyst at a temperature between 100° and 250° F. and a pressure sufficient to maintain the reactants in the liquid phase; said low and high carbon number alpha olefins being present in said mixture in such molar proportions that the mean value of the carbon atoms per molecule in the mixture is between 9 and 14.

2. A method according to claim 1 wherein the low carbon number alpha olefin is hexene-1 and the high carbon number alpha olefin is tetradecene-1.

3. A method according to claim 1 wherein the low carbon number alpha olefin is octene-1 and the high carbon number alpha olefin is tetradecene-1.

4. A method according to claim 1 wherein the low carbon number alpha olefin is decene-1 and the high carbon number alpha olefin is hexadecene-1.

5. A process according to claim 1 wherein said mixture of said low and said high carbon number olefins is added to a second mixture of a saturated hydrocarbon diluent containing said Friedel-Crafts catalyst, the amount of Friedel-Crafts catalyst in said second mixture being between 1 and 10 weight percent of said olefin mixture and the weight ratio of said diluent to said olefin mixture being between 0.5 and 10.

6. A process according to claim 5 wherein the Friedel-Crafts catalyst is an aluminum halide.

7. A method according to claim 6 wherein the diluent comprises a paraffin having between 5 and 8 carbon atoms and the reaction temperature is the reflux temperature of said paraffin diluent.

8. A method according to claim 6 wherein the aluminum halide is $AlCl_3$ and the paraffin diluent is heptane.

9. A method of preparing a lubricating oil composition having a molecular weight between 500 and 1500; a viscosity at 210° F. between 58 and about 110 SUS; a viscosity index greater than about 120 and a pour point of less than about plus 10° F. which comprises copolymerizing a mixture of at least one alpha olefin having between 6 and 8 carbon atoms per molecule and at least one alpha olefin having between 15 and 16 carbon atoms per molecule in contact with at least one percent by weight of said olefin mixture of a Friedel-Crafts catalyst at a temperature between 100° and 250° F. and a pressure sufficient to maintain the reactants in the liquid phase; said low and high carbon number alpha olefins being present in said mixture in such molar proportions that the mean value of the carbon atoms per molecule in the mixture is between 10 and 12.

10. A method of preparing a lubricating oil composition having a molecular weight between 500 and 1500; a viscosity at 210° F. between 58 and about 110 SUS; a viscosity index greater than about 120 and a pour point of less than about plus 10° F. which comprises copolymerizing an equimolar mixture of one low carbon number alpha olefin and one high carbon number alpha olefin, the one low carbon number alpha olefin having between 6 and 8 carbon atoms per molecule, and the one high carbon number alpha olefin having between 15 and 16 carbon atoms per molecule in contact with at least one percent by weight of said olefin mixture of a Friedel-Crafts catalyst at a temperature between 100° and 250° F. and a pressure sufficient to maintain the reactants in the liquid phase.

11. A method according to claim 10 wherein the low carbon number alpha olefin is octene-1 and the high carbon number alpha olefin is hexadecene-1.

References Cited
UNITED STATES PATENTS

| | | | |
|---|---|---|---|
| 2,559,984 | 7/1951 | Montgomery et al. | 260—683.15 |
| 2,620,365 | 12/1952 | Anderson | 260—683.15 |
| 3,156,736 | 11/1964 | Southern et al. | 260—683.15 |
| 3,206,523 | 9/1965 | Antonson | 260—683.15 |
| 3,253,052 | 5/1966 | Antonson et al. | 260—683.15 |

DELBERT E. GANTZ, *Primary Examiner.*

R. H. SHUBERT, *Assistant Examiner.*